United States Patent [19]

Ahuja

[11] 4,369,341
[45] Jan. 18, 1983

[54] CUSTOMER LINE TEST TERMINATION DEVICE

[75] Inventor: Omprakash G. Ahuja, East Meadow, N.Y.

[73] Assignee: TII Industries, Inc., Copiague, N.Y.

[21] Appl. No.: 262,451

[22] Filed: May 11, 1981

[51] Int. Cl.³ .............................................. H04M 3/24
[52] U.S. Cl. ...................... 179/175.2 R; 179/175.2 B; 179/175.2 C; 324/51; 324/133; 340/515
[58] Field of Search ................. 179/175.2 R, 175.2 C, 179/175.2 Y, 175, 175.1 R, 175.11, 84 L; 324/51, 133; 340/514, 515

[56] References Cited

U.S. PATENT DOCUMENTS 4,309,578 1/1982 Ahyja .............................. 179/175 X Primary Examiner—Stafford D. Schreyer
Attorney, Agent, or Firm—Martin Sachs

[57] ABSTRACT

A line test termination device for use on a telephone subscriber line having a pair of electrically conductive paths to provide an audio-visual indication when interrogated by the telephone central office and a subscriber test to indicate the operability of the subscriber line includes in combination, a first current path having a neon tube and an audio indicator connected in series; a second current path with a first normally open switch, a first resistor, a first zener diode and an indicating meter connected in series, all of which are placed in parallel with the first current path. Additionally included is a current polarizing circuit arrangement connected across the pair of electrically conductive paths to provide a unidirectional flow of current through the first and second current paths regardless of the polarity of voltage applied across the pair of electrically conductive paths. A second switch and a second resistor are connected across the neon tube to provide the subscriber with means for obtaining a dial tone without the use of a telephone instrument. All of the above components may be disposed within a housing that may be permanently left across the subscriber line and received into a conventional telephone socket.

12 Claims, 7 Drawing Figures

CUSTOMER LINE TEST TERMINATION DEVICE

BACKGROUND OF THE INVENTION

1. Field of the Invention

The present invention relates to telephone line test termination devices and, in particular, to a circuit arrangement which may be utilized by the central test office to provide an audio-visual signal when being interrogated and a subscriber test to indicate the operability of the subscriber line.

2. Discussion of the Relative Art

Many different types of circuit arrangements have been suggested for use in testing telephone subscriber lines from a remote location. Generally, these circuit arrangements require installation or must be utilized by a telephone installer who must physically visit the premises where the telephone is installed and then signal the central office so that the central office test operator may perform the required test to determine if the subscriber lines are in working order. Many of these circuit arrangements include a switching device and a tuned circuit which is activated from the central office. These components are unreliable and require an installer to enter the home where the telephone is located. This is unsatisfactory for numerous reasons. Generally, the devices are unable to remain permanently at the installed telephone, or if they are capable of being installed permanently, they require activation by an AC signal provided by the central office. None of the devices heretofore are capable of providing a visual indication in addition to an audible signal at the premises where the telephone is installed during the testing of the subscriber lines by the central office test operator. Requiring a telephone installer to enter the customer's premises or requiring activation of the equipment by a superimposed signal from the central office is an unreliable method and therefore is unsatisfactory.

A simple reliable means of providing a circuit arrangement which may be utilized by the central office test operator together with a customer and that is capable of providing an audible signal and visual indication to the customer when being interrogated by the central office to indicate that the subscriber line is intact and operable by merely utilizing a DC test voltage, a milliammeter and a reversing switch, is an ideal solution to the problem. Moreover, providing means for the subscriber to observe a meter reading by pushing an intermittent test button and/or obtain a dial tone, without the use of a telephone instrument to further verify the operability of the subscriber line is even more desirable.

SUMMARY OF THE INVENTION

The present invention overcomes the shortcomings of the prior art by providing a simple, circuit arrangement that is capable of providing an audible and visual indication at the subscriber's/customer's telephone termination, which may be installed permanently at the customer's telephone or station protector, be installed by the use of a removable plug, or may be provided with the installation of new telephone equipment by providing the instant circuit arrangement in the instrument and/or its associated plug.

Therefore, it is an object of the present invention to provide a simple, inexpensive circuit arrangement that may be connnected across a subscriber line and provide an audible and visual signal at the subscriber's/customer's telephone or station protector while being interrogated by a central office test operator and also is capable of providing a dial tone and meter reading to indicate that the standby voltage is of the proper value for the subscriber's line.

It is another object of the present invention to provide a subscriber termination device which provides an audible and visual indication when interrogated by the central office and may be left across the subscriber line at all times.

It is yet another object of the present invention to provide a reliable termination device for telephone subscriber lines that may be utilized as an auxiliary ringer, provide a visual indication as well as audible tones when ringing voltage is applied thereto.

It is yet still another object of the present invention to provide a termination device that will provide an audible and visual indication when the subscriber's line is being interrogated by the central office, is insensitive to the polarity of voltage utilized and will provide an indication when test voltage or ringing voltage is applied to the subscriber's line.

A line test termination device for use on a telephone subscriber line having a pair of electrically conductive paths to provide an audible-visual indication when interrogated by the telephone central office and a subscriber test to indicate the operability of the subscriber line, according to the principles of the present invention, comprises in combination; a first current path having a light emitting voltage breakover device connected in series with an audio indicator device and a second current path having a first normally open switch, a first resistor, a first voltage breakover device and an indicating device connected in series. The second current path is connected in parallel with the first current path. Additionally provided, is a current polarizing device connected across the pair of electrically conductive paths for providing a unidirectional flow of current through the first and second current paths regardless of the polarity of voltage applied across the pair of electrically conductive paths. A second resistor and a second switch is provided across the light emitting voltage breakover device to enable a subscriber to obtain a dial tone without the use of a telephone instrument. All the components are housed in a wall mounted connecting device which mates with a connecting device provided on a telephone instrument or they are mounted within a housing having a connecting device on one end which mates with the wall mounted connecting device and has a connecting device on the opposite end that mates with the connecting device provided on the telephone instrument.

The foregoing and other objects and advantages will appear from the description to follow. In the description, reference is made to the accompanying drawing which forms a part thereof, and in which is shown by way of illustration, a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which.

DESCRIPTION OF THE PREFERRED EMBODIMENT

Figure 1:
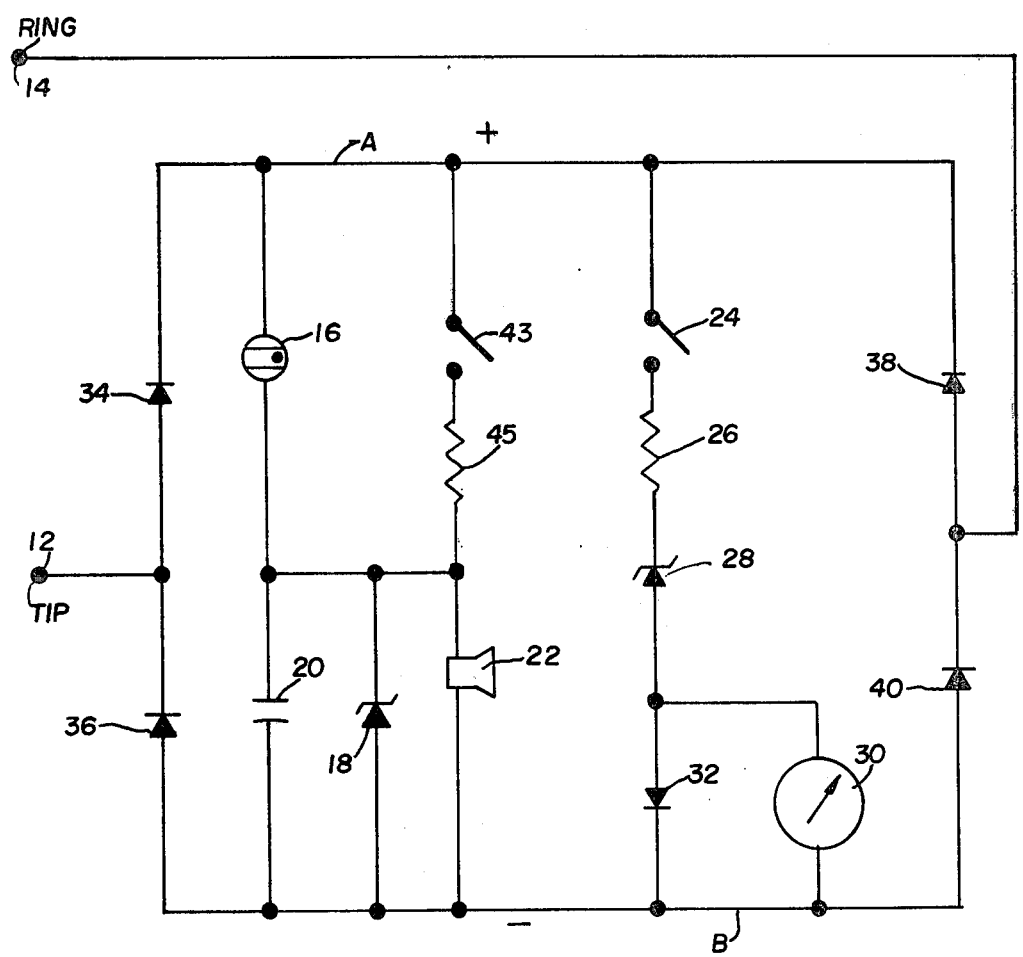
FIG. 1 is a schematic circuit diagram of the preferred embodiment, according to the principles of the present invention.
Figure 2:
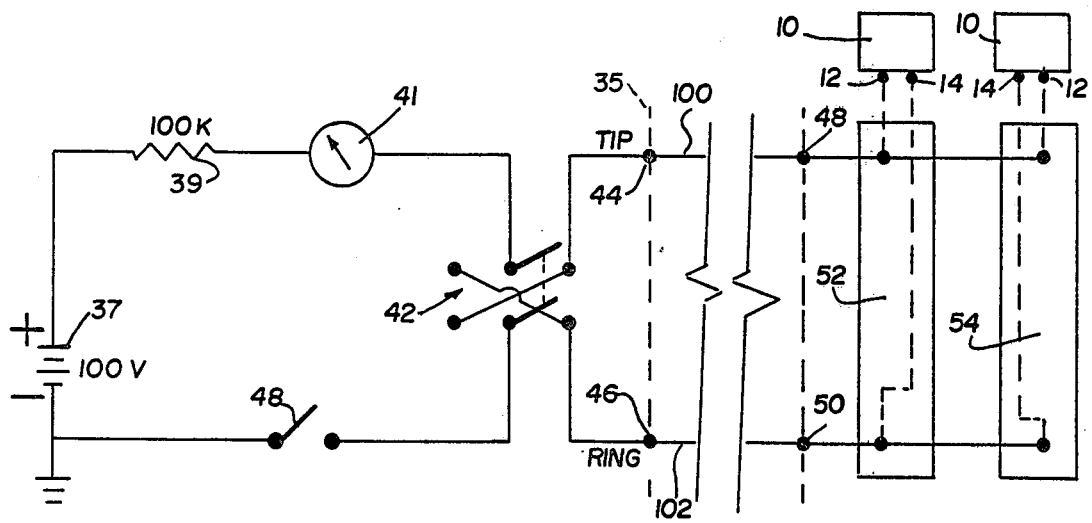
FIG. 2 is a schematic circuit and functional block diagram of the continuity test performed by the central telephone office on a subscriber line.
Figure 4:
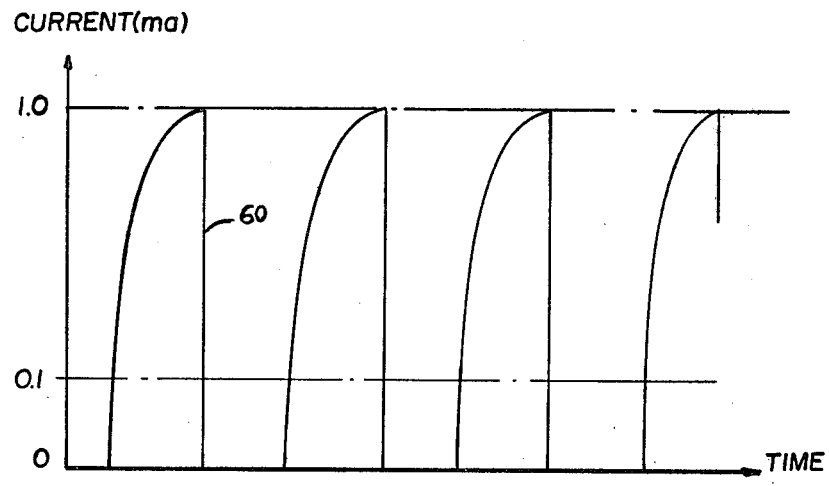
FIG. 4 is a pictorial representation of current versus time showing continuous variations in current into the audio indicator of the instant invention when it is interrogated by the central office.

Referring now to the figures, and in particular, to FIG. 1, there is shown a preferred embodiment 10 of a customer line test termination circuit arrangement, which may be connected across a subscriber line having a pair of electrically conductive paths 100 and 102, as shown in FIG. 2. The tip terminal 12, shown in FIG. 1, is connected to one of the conductive paths 100 while the ring terminal 14 is connected to the other conductive path 102 of the subscriber line providing two series current paths therebetween. One series current path includes a light emitting voltage breakover device 16, preferably a neon tube, and an audio indicator 22. For convenience, the input to the series current path is given the reference designation A and the output of the series current path is given the reference designation B. A voltage breakover device 18, preferably a zener diode, is connected across or in parallel with the audio indicator 22 in order to limit the voltage thereacross to its safe operating value. A capacitor 20 is connected in parallel or across audio indicator 22 and functions to filter the current pulses flowing through the audio indicator when a DC voltage is applied thereto, as will be explained hereinafter. The current versus time of the audio indicator when subjected to a test voltage is shown in FIG. 4.

A second series current path provided between points A and B includes a normally open, momentary, switch 24, a resistor 26, a voltage breakover device 28, preferably a zener diode, and a means for indicating current or voltage 30, which in the preferred embodiment is a miniaturized voltmeter. The diode 32, preferably of the semiconductor type, is connected in parallel with the voltmeter 30 to limit the voltage appearing thereacross, should the normal input test voltage (100 volts DC) be exceeded for any reason while a voltage reading is being taken. Note that the diode 32 and the zener diode 28 are poled in opposite directions in order to provide the proper operation. The components in each of the two current paths are connected in series. Therefore, their position in these paths is not critical as long as the semiconductors are poled as indicated.

The two series paths, since they are both connected from the point A to the point B, may be considered to be in parallel with A being designated as the input to the two current paths and B being designated as the output of the two current paths for convenience. The reasons therefor will become apparent hereinafter.

Four diodes 34, 36, 38 and 40, preferably of the semiconductor type, are connected in what is commonly referred to as a bridge connection, with the cathode electrode of diodes 34 and 38 being connected to the point designated as A and the anode electrodes of diodes 36 and 40 being connected to the point designated as B. The anode electrode of diode 34 and the cathode electrode of diode 36 are connected to the tip terminal 12. The anode electrode of diode 38 and cathode electrode of diode 40 is connected to the ring terminal 14.

Thus, it is obvious to those knowledgeable in the art, that the point designated as A will always be positive with respect to the point designated as B regardless of the polarity of the voltage appearing between terminals 12 and 14. It is also to be noted by observing the schematic shown in FIG. 1, that the two series current paths have, with a positive voltage apllied to terminal 12 with respect to terminal 14, a diode 34 connected to the input of the two series current paths connected in parallel (A) and a diode 40 connected at the output of the two series current paths connected in parallel (B) before the ring terminal 14 can be reached. In a like manner, if a positive voltage is supplied to ring terminal 14, with respect to terminal 12, diode 38 provides a series path to the input of the two series current paths (A) and diode 36 is connected to the output of the two parallel series current paths (B) before terminal 12 can be reached. Thus, diodes 34, 36, 38 and 40 may be said to polarize the current flowing between terminals 12 and 14 by insuring that a unidirection flow of current appears in the two series current paths connected in parallel between points A and B. The circuit arrangement as shown in FIG. 1 may be connected across a conventional voltage arrester, not shown, or installed across any other device placed across a subscriber line as shown in FIG. 2. For a more detailed discussion as to the housings that may be utilized for the customer/subscriber line test termination circuit arrangement, reference may be made to FIGS. 5, 6 and 7 which will be discussed hereinafter.

In operation, a DC voltage is applied across terminals 12 and 14 by the central office test operator when he interrogates the subscriber line to determine its continuity. The operation of this test interrogation circuitry will be explained in conjunction with FIG. 2. However, it is to be noted that a positive voltage appearing on terminal 12 with respect to terminal 14 will permit the same amount of current to flow as when a positive voltage appears on terminal 14 with respect to terminal 12. The amount of current that does flow, of course, depends on the distance that the termination device is from the central office test station and the DC voltage utilized for the interrogation. If the voltage applied from the test station is sufficiently high (typically 100 volts DC) it will break over the light emitting voltage breakover device (neon tube) 16 which typically requires voltage in excess of 90 volts, thereby permitting current to flow into the audio indicator 22. Since voltage breakover device 16 is capable of emitting light, both a visual and audible indication will be obtained by an observer at the location where the termination device has been installed. Thus, a customer or subscriber positioned proximate the device will be capable of determining when the central office test operator is interrogating a subscriber line. Moreover, if the subscriber were to momentarily close switch 24, during a period of time other than when the line is being interrogated, voltmeter 30 will indicate the voltage appearing on the line during normal standby operation of the subscriber line. This voltage is approximately 48 volts DC and depends upon the distance from the telephone central office that supplies this voltage. The voltmeter 30 may be provided with a voltage range similar to that shown in FIG. 3 wherein, for example, the reading obtained between points 56 and 58, which may be painted in red on the meter face, will indicate that the voltage on the line is lower than that desirable and the subscriber should report this to the central office for repair services. In the preferred embodiment, resistor 26 is selected to be approximately 10 K ohms, zener diode 28 has a breakover voltage of approximately 39 volts, capacitor 20 has a value of 2.2 microfarads and zener diode 18 has a breakover voltage of 10 volts.

Utilizing a second momentary switch 43 connected in series with a resistor 45, preferably approximately 240 ohms, connected across breakover device 16 (from point A to the audio indicator 22) the subscriber is able to obtain a dial tone by the momentary closing of normally open switch 43. Thus, the subscriber/customer can verify that the subscriber line is in operating order by momentarily closing switch 43 and obtaining the dial tone without the use of a telephone instrument. Thus, the subscriber is capable of determining if the subscriber line is in operating order up to the place where the customer line test device has been installed without the aid of the central office test operator and if the proper indications are not obtained a call to a telephone repair service can be made to correct the condition.

The audio indicator 22 suitable for use in the instant circuit arrangement is Model No. AL-250 manufactured by Projects Unlimited, Inc., of Dayton, Ohio 45414.

FIG. 2 discloses a test circuit arrangement utilized by the telephone central office to interrogate a subscriber line in order to determine if the line is in operating order and is not broken or open somewhere between the central office and the subscriber's home. All the items shown to the left of broken line 35 are generally located at the telephone central office at the test station and includes a DC voltage source 37 (approximately 100 volts) which has a series current limiting resistor 39 of approximately 100,000 ohms connected in series with a milliammeter 41 and a polarity reversing voltage switch 42 connected to terminals 44 and 46, and a switch 48 which is also included to complete the test circuit path. The subscriber telephone lines 100 and 102 are connected to terminals 44 and 46, respectively, at the central office and are connected to terminals 48 and 50, respectively, at the subscriber's end where the telephone instruments 52 and 54 are to be installed. Any number of telephone instruments 52,54 may be connected in parallel, in a conventional manner. Each of the telephone instrument terminations may include a line test termination device 10 connected across the instrument conductive wires as shown therein. The audible line test termination device 10 may be incorporated in a housing which may be readily installed into a receptacle presently in use by the telephone company. The housing may also provide a means for accepting a telephone hand-set plug so that it may be left in position permanently.

With the present utilization of telephone plugs and jacks by the telephone companies, the instant invention is ideally suited for use therewith, since the telephone subscriber is permitted to install his own telephone instrument, the telephone line must be checked by the central office in order to determine its suitability for use. These tests, which are made by the central office test operator, determine if the subscriber line is open, shorted, grounded or has a foreign battery on it. Without a telephone set and its associated ringer connected to the line, the test for continuity (open circuit) cannot be reliably made unless telephone personnel are dispatched to the customer's location to assist in performing the test.

With the instant invention, this shortcoming is overcome. The central office may now check the subscriber line where a customer line test termination device has been installed, and with the cooperation of the customer, the test is verified by providing an audible and visual signal to the customer in addition to the customer providing the central office with information as to voltage appearing at the termination and dial tone verification without an instrument. The central office test desk makes the loop continuity test by accessing the subscriber line in the conventional manner and operates the ground key (switch 48) on the test board. Switch 48 applies 100 volts DC in series with a 100 K ohm resistor 39 through the tip side of the subscriber's line and provides a ground to the ring side of the line. By operating the reverse key or switch 42, these connections are changed so that the voltage is applied to the ring side of the subscriber line and the ground is applied to the tip side of the subscriber line.

A good subscriber line without an audible station termination device 10 connected to it will cause a test board meter 41 to read zero (except that a brief meter "kick" will be observed while the ringing capacitor charges if it is connected to the line during this rest). Operating the reverse key (switch 42) while keeping the ground key (switch 48) closed will also produce the same effect. If no ringer is connected, it cannot be determined from the 0 meter reading if the line has continuity to the station protector or to the telephone jack at the subscriber location. If a short circuit exists anywhere along the tip or ring conductors of the line, the meter reading would be somewhere between 0 and 100 and would not change when the reverse switch 42 is operated.

Figure 3:
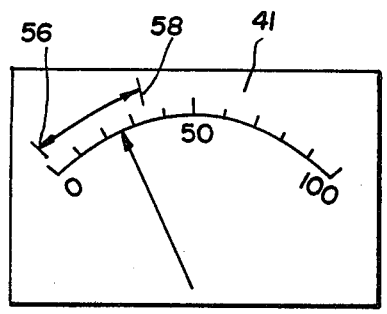
FIG. 3 is a pictorial representation of a meter face at the central office when interrogation of a subscriber line is made.

If a customer line test termination device as disclosed hereinabove is installed at the subscriber location, the telephone office test desk meter 41 shown enlarged in FIG. 3, will indicate a finite value 58 on a good line or zero (56) on an open line when the positive voltage is applied to the tip side of the line (terminal 44) as when switch 42 is in the right-hand position shown in FIG. 2. By moving switch 42 to the left-hand position as shown in FIG. 2, the positive voltage from the DC test source 37 will be applied to the ring side of the line (terminal 46) and the meter will assume the same value between 0 and 100 (58), depending on the distance the termination is located from the central office test station. The current through the audio indicator 22 will vary at a rate somewhere between 3 and 5 K Hz depending upon the actual voltage available thereacross. The rapid change of current through the audio indicator will not be apparent at the meter 41 because the percentage variation in current compared to the total current being fed to the lines is small, capacitor 20 will filter or smooth it out, and the meter 41 is not capable of responding to variations occurring in this frequency range. Therefore, the meter will assume an average value and remain thereat.

Since the preferred embodiment utilizes a capacitor 20 the test circuit operator will see the current variation in the meter when the polarity is reversed and will always see the "kick" caused by capacitor 20 since it is always across the line. With the preferred embodiment as disclosed in FIG. 1, superimposing an AC voltage upon the normal DC (48 volts) appearing on the subscriber line will provide a sufficiently high DC voltage, when rectified by diodes 34, 36, 38 and 40 to break over neon tube 16 to provide both an audible and visual indication that ringing voltage is impressed on the subscriber line. Therefore, an audio output is obtainable from the preferred embodiment when the subscriber line is undergoing interrogation by the test operator at the central office and when ringing voltage is applied thereto.

Figure 5:
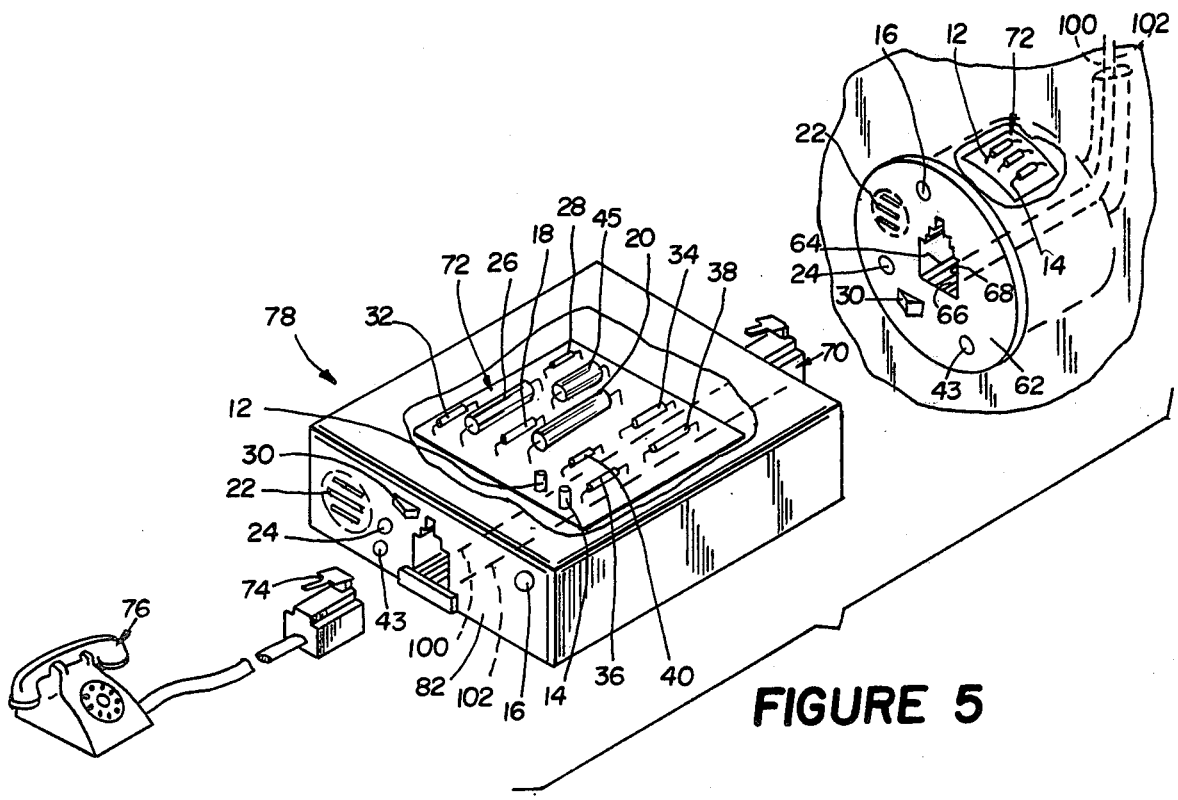
FIG. 5 is a pictorial representation, not to scale, of three alternative housings, partially broken away, which may be utilized in the instant invention.

FIG. 5, shown with enlarged portions, discloses a plurality of housings for the customer line test termination device 10 which is capable of providing a characteristic signature to the telephone central office, not shown, when a continuity test is made on a subscriber's telephone line generally consisting of a pair of electrically conductive wires 100 and 102, which are connected to the telephone central office. The wires 100 and 102 are terminated by the telephone company in a wall socket 62 which provides electrically conductive contacts 64 and 66 onto which wires 100 and 102 are affixed, in a conventional manner. The wall socket 62 is provided with an aperture 68 having an irregular shape which is adapted to mate with a male plug 70 that is provided with electrically conductive contacts, not shown, that cooperate with contacts 64 and 66 of receptacle 62, thereby continuing the electrically conducting path therethrough. The wires (electrically conductive paths) 100 and 102 have connected thereacross one series current path that includes breakover device 16 and audio indicator 22 with zener diode 18 and capacitor 20 connected in parallel with it and a second series current path which includes switch 24, resistor 26 zener diode 28 and meter 30 with diode 32 connected thereacross. Both series current paths are connected in parallel and have two diodes poled in the same direction connected in series with them. One diode is connected at the input to the series current paths and one diode is connected to the output of the series current paths. Another pair of oppositely poles diodes have one thereof connected to the input of the series current paths and the other connected to the output of the series current paths, all of which are connected across terminals 12 and 14, as explained earlier. Preferably, these components are connected across terminals 12 and 14 and are mounted on a miniature printed circuit board 72 which has thereon terminals 12 and 14. Terminals 12 and 14 are connected across the conductive wires 100 and 102 and may be affixed there permanently. The circuit arrangement will thus, provide a characistic signature when a telephone line cord plug 74, that is normally provided on a telephone set 76, is inserted into aperture 68 or omitted therefrom.

In an alternative embodiment, the line cord plug 74 appearing on instrument 76 may be provided in housing 78, shown as a plug 70 provided at one end, and is provided with a receptacle or socket 80 adapted to receive telephone line plug 74 therein to continue the electrical conductive paths formed by wires 100 and 102 which are continued through plug 70 to the contact area of receptacle 80. The circuit arrangement, as disclosed in FIG. 1, may be included on a printed circuit board 72 and connected across conductive paths 100 and 102 in the same manner as that disclosed for socket 62. The audio indicator 22, neon tube 16, voltmeter 30 and switches 24 and 43 mounted in the end surface 72 of housing 73, so that audio and visual indication may be readily radiated into the room where the interrogation of the subscriber line up to and including, the housing 78 is made by the telephone central office, and the subscriber may readily activate switches 24 and 43. Thus, the circuit arrangement may be installed in a separate housing 78 or in a wall socket 72. Moreover, it may be even more convenient for the telephone company to install the preferred circuit arrangement in the telephone set 76 with the audio indicator 22 and neon tube 16, either provided in the telephone itself, or in its associated line cord plug.

Figure 6:
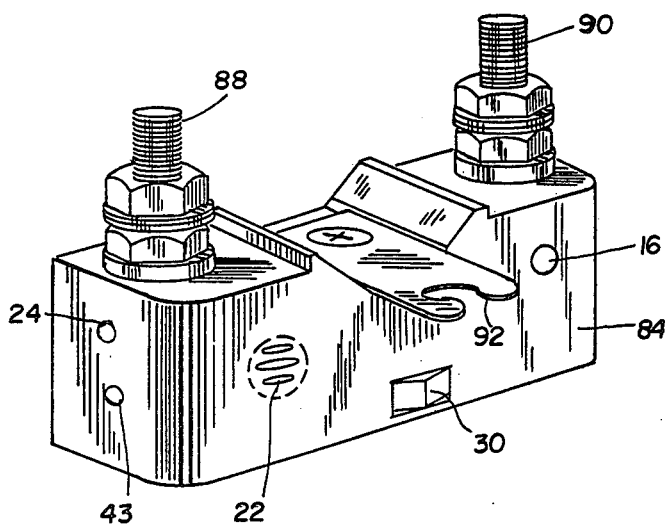
FIGS. 6 and 7 are further alternative housings for the instant invention.
Figure 7:
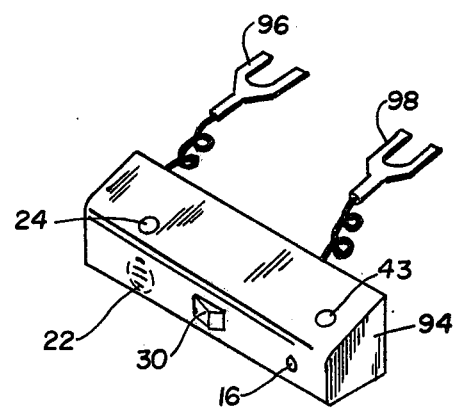

Yet another embodiment of a housing suitable for any of the circuit arrangement disclosed hereinbefore is shown is FIG. 6. Housing 84 may include a two or three-electrode gas tube arrester, a fail-short device, a back-up air gap device, not shown, known as TII-355 and TII 356 manufactured by TII Industries, Inc. of Copiague, N.Y., the neon tube 16, the audio indicator device 22, meter 30 and switches 24 and 43 mounted in the housing as shown in FIGS. 6 and 7. The housing shown in FIG. 6 includes terminals 88 and 92 and a ground lug 92. Terminals 88 and 90 are readily wired across the subscriber telephone line 100 and 102 at some point where the subscriber line comes into the residence. It is suitable for both indoor and outdoor installations and may be provided in a housing, not shown, wherein a plurality of housings 84 may be conveniently installed. Of course, ground lug 92 is connected to earth ground, in a conventional manner, to provide a path for any over voltage or lightning strike. The embodiment disclosed in FIG. 7 includes a housing 94 which has extending therefrom a pair of spade lugs 96 and 98 which may be wired across the subscriber's line 100 and 102 at any convenient point. An audio-visual indication of interrogation by the central office is provided by the audio indicator 22 and the neon tube 16 mounted on the top surface of housing 94.

Hereinbefore has been disclosed a customer line test termination device and circuit arrangement therefor which is relatively inexpensive to manufacture and is readily incorporated into presently existing telephone line cords, plugs and jacks. It will be understood that various changes in the details, materials, arrangement of parts and operating conditions which have been herein described and illustrated in order to explain the results of the invention may be made by those skilled in the art within the principles and scope of the present invention.

Having thus set forth the nature of the invention, what is claimed is:

1. A line test termination device for use on a telephone subscriber line having a pair of electrically conductive paths to provide an audio-visual indication when interrogated by the telephone central office and a subscriber test to indicate the operability of said subscriber line, comprising, in combination:

(a) a first current path having a light emitting voltage breakover means connected in series with an audio indicator means;

(b) a second current path having a first normally open switch means, a first resistance means, a voltage breakover means and an indicating means connected in series, said second current path being connected in parallel with said first current path; and (c) current polarizing means, connected across said pair of electrically conductive paths for providing a unidirectional flow of current through said first and second current paths regardless of the polarity of the voltage applied across said pair of electrically conductive paths.

2. A line test termination device according to claim 1 further including a first voltage breakover means connected across said audio indicator means to limit the voltage thereacross to its safe operating level.

3. A line test termination device according to claim 1 further including a capacitor means connected across said audio indicator means for filtering the variations in current caused thereby.

4. A line test termination device according to claim 1 further including a second normally open switch means connected in series with a second resistance means, said second switch means and said second resistance means being connected in parallel with said light emitting breakover means.

5. A line test termination device according to claim 1 further including a diode means, said diode means being connected in parallel with said indicating means to limit the voltage across said indicating means to its safe operating level, said diode being poled opposite to said second voltage breakover means.

6. A line test termination device according to claims 2 or 5 wherein said light emitting voltage breakover means is a neon tube.

7. A line test termination device according to claims 1, 2 or 5 wherein said voltage breakover means is a zener diode.

8. A line test termination device according to claim 1 wherein said current polarizing means includes four diode means, the first two of said diode means being poled in the same direction, one of said diode means being connected from the first of said subscriber electrically conductive paths in series with the input of said first and second current paths connected in parallel, the other similarly poled diode means being connected in series with the output of said first and second current paths to the second of said subscriber electrically conductive paths, the second two of said four diode means being poled in the same direction and both opposite to said first two of said four diode means, one of said second two diode means being connected from the second of said subscriber electrically conductive paths in series with the input of said first and second current paths connected in parallel, the other of said similarly poled second two diode means being connected from the first of said subscriber lines in series with the output of said first and second current paths connected in parallel.

9. A line test termination device according to claim 8 wherein said diode means is of the semiconductor type.

10. A line test termination device according to claims 1, 2, 3, 4 or 5 further including a housing, said housing having connecting means for connecting said current polarizing means between said pair of electrically conductive paths.

11. A line test termination device according to claims 1, 2, 3, 4 or 5 further including a housing, said housing including input and output connecting means for continuing said electrically conductive paths, said input connecting means being adapted to be received by a wall receptacle having therein said electrically conductive paths extending to said telephone central office, said housing havind said light emitting voltage breakover means and said audio indicator means in said first current path, said first switch means, said first resistance means, said first voltage breakover means, said indicating means, and a diode means in said second current path, and said current polarizing means disposed therein.

12. A line test termination device according to claims 1, 2, 3, 4 or 5 further including a housing, said housing including connecting means for continuing said electrically conductive paths from said telephone central office, said connecting means being adapted to receive a mating connector means provided on a telephone instrument and continue said mating connector means to said telephone instrument, said housing having said light emitting voltage breakover means and said audio indicator means in said first current path, said first switch means, said first resistance means, said first voltage breakover means, said indicating means and a diode means in said second current path, and said current polarizing means disposed therein.

* * * * *